(12) United States Patent
Miyazaki (10) Patent No.: US 11,196,912 B2
(45) Date of Patent: Dec. 7, 2021

(54) RECORDING CONTROL APPARATUS, RECORDING CONTROL METHOD, AND PROGRAM

(71) Applicant: CANON KABUSHIKI KAISHA, Tokyo (JP)

(72) Inventor: Shigeyuki Miyazaki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/918,787

(22) Filed: Jul. 1, 2020

(65) Prior Publication Data
US 2021/0006705 A1    Jan. 7, 2021

(30) Foreign Application Priority Data

Jul. 2, 2019 (JP) .............................. JP2019-123740

(51) Int. Cl.
*H04N 5/232* (2006.01)
(52) U.S. Cl.
CPC .............................. *H04N 5/23206* (2013.01)
(58) Field of Classification Search
CPC .......... G06K 9/00771–0077; G06K 9/46–527; G06K 9/62–726; G06K 2209/21; H04W 4/008; H04N 5/23203

USPC ........................... 382/103; 396/56–59; 705/3
See application file for complete search history.

(56) References Cited

U.S. PATENT DOCUMENTS

| | | | |
|---|---|---|---|
| 2014/0067420 A1* | 3/2014 | Ohta | G16H 80/00 705/3 |
| 2015/0195442 A1* | 7/2015 | Pacurariu | H04N 5/23203 348/211.2 |
| 2019/0327451 A1* | 10/2019 | Takeno | G06K 9/00718 |

FOREIGN PATENT DOCUMENTS

JP          2005217858 A        8/2005

\* cited by examiner

*Primary Examiner* — Xi Wang
(74) *Attorney, Agent, or Firm* — Canon U.S.A., Inc. IP Division (57) ABSTRACT

A recording control apparatus that controls to record an image captured by a camera starts recording of the image captured by the camera based on information acquired from the camera. In a case where an instruction to delete the image is received from a upper-level system configured to acquire information different from the information acquired from the camera or in a case where an instruction to the image is not received from the upper-level system for a certain period, the recording control apparatus deletes the image captured by the camera.

13 Claims, 6 Drawing Sheets

| 501 | INSTRUCTION | RECORDING |
|---|---|---|
| | IMAGE ID | 10004 |

| 503 | INSTRUCTION | IMPORTANCE LEVEL 2 |
|---|---|---|
| | IMAGE ID | 10003 |

| 502 | INSTRUCTION | CANCEL |
|---|---|---|
| | IMAGE ID | 10002 |

| 504 | INSTRUCTION | APPARATUS STOP |
|---|---|---|
| | IMAGE ID | --- |

FIG.5B

| IMAGE ID | IMAGING START TIME | IMAGING END TIME | STATUS | STORAGE PATH | IMPORTANCE LEVEL |
|---|---|---|---|---|---|
| 10002 | 2019/01/28 15:58:12 | 2019/01/28 15:59:12 | RECORDED | C:\10002 | 1 |
| 10003 | 2019/01/28 15:40:05 | 2019/01/28 15:41:05 | RECORDED | C:\10003 | 1 |
| 10004 | | | | | |
| 10005 | | | | | |

FIG.5C

| IMAGE ID | IMAGING START TIME | IMAGING END TIME | STATUS | STORAGE PATH | IMPORTANCE LEVEL |
|---|---|---|---|---|---|
| 10002 | | | | | |
| 10003 | 2019/01/28 15:40:05 | 2019/01/28 15:41:05 | RECORDED | C:\10003 | 2 |
| 10004 | 2019/01/29 16:58:12 | | UNDER RECORDING | C:\10004 | 1 |
| 10005 | 2019/01/29 17:05:55 | | UNDER RECORDING | C:\10005 | 1 |

FIG.5D

| IMAGE ID | IMAGING START TIME | IMAGING END TIME | STATUS | STORAGE PATH | IMPORTANCE LEVEL |
|---|---|---|---|---|---|
| 10002 | | | | | |
| 10003 | 2019/01/28 15:40:05 | 2019/01/28 15:41:05 | RECORDED | C:\10003 | 2 |
| 10004 | 2019/01/29 16:58:12 | 2019/01/29 16:59:12 | STANDBY | C:\10004 | 1 |
| 10005 | 2019/01/29 17:05:55 | 2019/01/29 17:10:55 | STANDBY | C:\10005 | 1 |

FIG.5E

| IMAGE ID | IMAGING START TIME | IMAGING END TIME | STATUS | STORAGE PATH | IMPORTANCE LEVEL |
|---|---|---|---|---|---|
| 10002 | | | | | |
| 10003 | 2019/01/28 15:40:05 | 2019/01/28 15:41:05 | RECORDED | C:\10003 | 2 |
| 10004 | 2019/01/29 16:58:12 | 2019/01/29 16:59:12 | RECORDED | C:\10004 | 1 |
| 10005 | 2019/01/29 17:05:55 | 2019/01/29 17:10:55 | STANDBY | C:\10005 | 1 |

FIG.5F

| IMAGE ID | IMAGING START TIME | IMAGING END TIME | STATUS | STORAGE PATH | IMPORTANCE LEVEL |
|---|---|---|---|---|---|
| 10002 | | | | | |
| 10003 | 2019/01/28 15:40:05 | 2019/01/28 15:41:05 | RECORDED | C:\10003 | 2 |
| 10004 | 2019/01/29 16:58:12 | 2019/01/29 16:59:12 | RECORDED | C:\10004 | 1 |
| 10005 | | | | | |

RECORDING CONTROL APPARATUS, RECORDING CONTROL METHOD, AND PROGRAM

BACKGROUND

Field of the Disclosure

The present disclosure relates to a recording control apparatus, a recording control method, a program, and a recording medium.

Description of the Related Art

In a field of factory automation, a monitoring camera is installed to record an image of each of apparatuses present in a factory and a plant, a workpiece handled by production facilities, and a worker performing work. When a problem occurs, the image is reproduced and is used to investigate a cause of the problem.

In the production facilities, management of production has the highest priority. Therefore, a management apparatus such as an upper-level system that manages the production facilities and a recording apparatus having recording responsibility are installed as physically different apparatuses such that processing performance and trouble of the recording apparatus do not influence production efficiency.

Examples of the upper-level system include a supervisory control and data acquisition (SCADA) system and a manufacturing execution system (MES). For example, the SCADA can communicate with various devices connected to a production system, and can acquire an operation state of each of the devices, error which has occurred in each device, measurement values of each device, and a handling state made to each of the devices by an operator. For that purpose, the management apparatus and the recording apparatus are connected through a network such as a local area network. Further, a recording target may be disposed at a place separated from the recording apparatus. Therefore, the monitoring camera to be used by the recording apparatus is also connected to the recording apparatus through the network.

Japanese Patent Application Laid-Open No. 2005-217858 discusses a system that includes a security camera and an image recording apparatus which records information about an image captured by the security camera. In the system, when a set time elapses, the image recording apparatus automatically starts recording of the information about the image captured by the security camera.

In the system discussed in Japanese Patent Application Laid-Open No. 2005-217858, the recorded image information may include an image which does not require recording. For example, in a case where an inspector enters an area in order to maintain the apparatus where entrance of a person is normally handled as an event, it is unnecessary to detect the entrance of the inspector as the event and to record an image of the entrance of the inspector. Recording the unnecessary image may interrupt search of a desired image.

SUMMARY

The present disclosure is directed to deletion of an image not requiring recording.

According to an aspect of the present disclosure, a recording control apparatus that records an image captured by an imaging apparatus, includes a control unit configured to control start of recording of the image captured by the imaging apparatus based on information acquired from the imaging apparatus, and a reception unit configured to receive an instruction with respect to the image, recording of which has been started by the control unit, from an external apparatus configured to acquire information different from the information acquired from the imaging apparatus. In a case where an instruction to delete the image is received from the external apparatus or in a case where an instruction to the image is not received from the external apparatus for a certain period, the control unit perform control to delete the image, recording of which has been started.

Further features of the present disclosure will become apparent from the following description of exemplary embodiments with reference to the attached drawings.

DESCRIPTION OF THE EMBODIMENTS

An exemplary embodiment of the present disclosure is described in detail below with reference to drawings.

Figure 1:
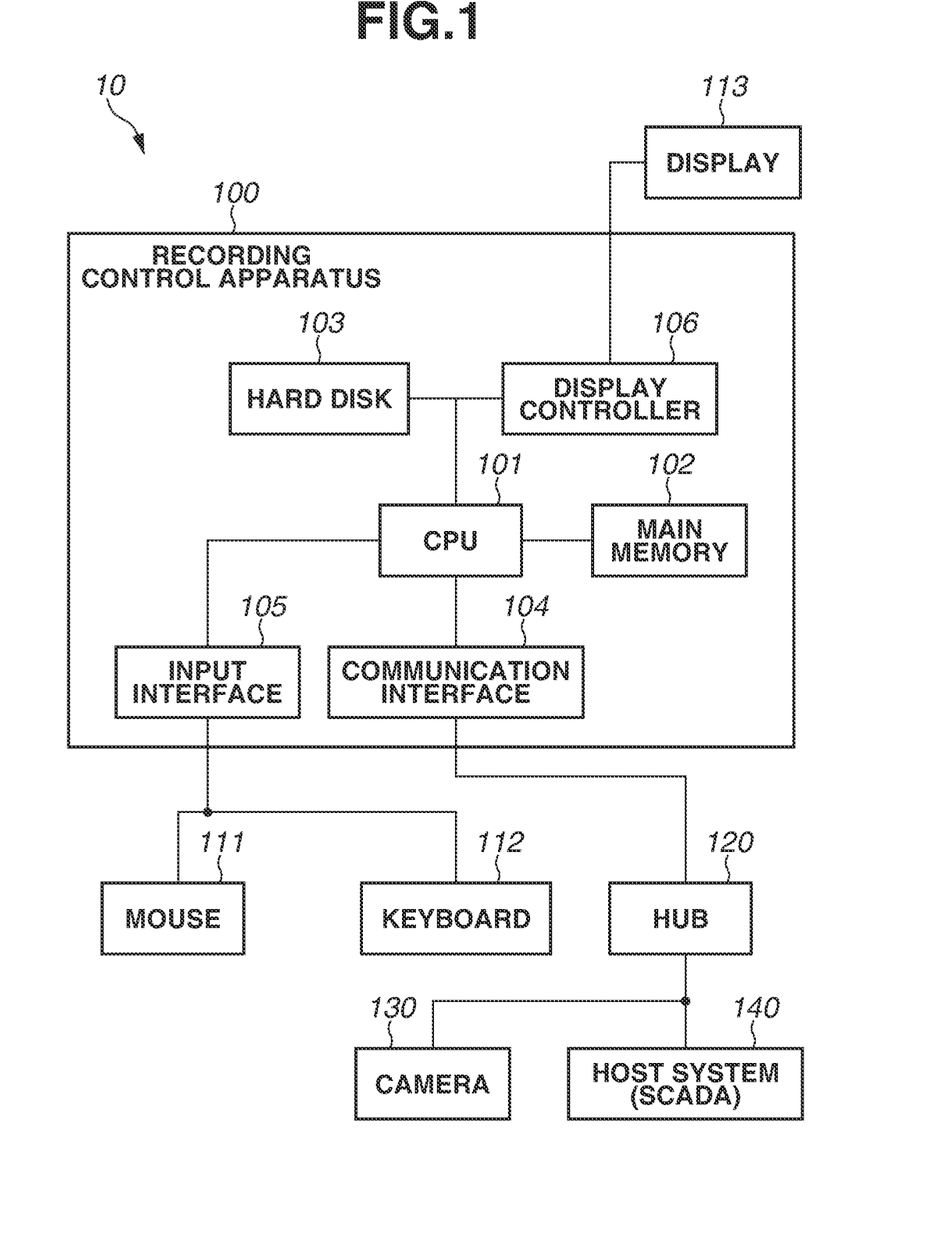
FIG. 1 is a diagram illustrating an example of a schematic configuration of a recording system.

A first exemplary embodiment is described. FIG. 1 is a diagram illustrating an example of a schematic configuration of an image recording system 10.

The image recording system 10 includes a recording control apparatus 100, a camera 130, and an upper-level system 140. The recording control apparatus 100 is connected to the camera 130 and the upper-level system 140 through a hub 120.

The recording control apparatus 100 records an image captured by the camera 130. As the recording control apparatus 100, a recording apparatus previously incorporating a recording medium or a recording apparatus to which a recording medium can be externally attached is usable.

The recording control apparatus 100 includes a central processing unit (CPU) 101, a main 102, a hard disk 103, a communication interface 104, an input interface 105, and a display controller 106.

The CPU 101 controls the units of the recording control apparatus 100 to control the entire recording control apparatus 100. Further, the CPU 101 develops programs recorded in the hard disk 103 onto the main memory 102, and executes the programs to realize functions of the recording control apparatus 100. The CPU 101 corresponds to an example of a control unit.

The main memory 102 is a work memory necessary for operation of the CPU 101. Further, the main memory 102 temporarily stores the image received from the camera 130. The main memory 102 corresponds to an example of a certain storage area.

The hard disk 103 stores programs to be executed by the CPU 101. Further, the hard disk 103 stores the image temporarily stored in the main memory 102. The hard disk 103 corresponds to an example of a recording medium. The recording medium is not limited to the hard disk 103 as long as the recording medium can record an image, and a solid state drive (SSD) or the like may be used as the recording medium.

The communication interface 104 performs communication with outside. The communication interface 104 corresponds to an example of a transmission unit and a reception unit. The communication interface 104 according to the present exemplary embodiment communicates with the camera 130 and the upper-level system 140 through the hub 120.

The input interface 105 receives input from an external input device. The input interface 105 according to the present exemplary embodiment receives input from a mouse 111 and a keyboard 112. The display controller 106 displays a result of the programs executed by the CPU 101, etc. on a display 113.

The camera 130 is disposed to capture an image of, for example, production facilities, and transmits the captured image to the recording control apparatus 100. For example, a network camera can be used as the camera 130. The camera 130 corresponds to an example of an imaging apparatus. The camera 130 according to the present exemplary embodiment has an image analysis function, and can detect occurrence of an event based on the captured image. Further, the camera 130 can detect end of the event when the event ends. The event to be detected includes a plurality of types, and at least one of moving object detection, removed object detection, abandoned object detection, camera tampering detection, and passing detection is included in the event detection.

In the moving object detection, a specific subject such as a person and an object is recognized from the image. When the specific subject is present at a position different between frames and the position of the specific subject is changed at a predetermined or more speed, presence of a moving object is detected.

In the removed object detection, a subject present in a specific area of each of frames of the image is analyzed. When an object present in a preceding frame is not present in a succeeding frame, and a certain time elapses while the object is not present in the frame, presence of removed object is detected.

In the abandoned object detection, a subject present in a specific area of each of frames of the image is analyzed. When an object absent in a preceding frame is present in a succeeding frame, and a certain time elapses while the object is present in the frame, the abandoned object is detected.

In the camera tampering detection, when a predetermined image is recognized in an area occupying a predetermined ratio or more of the entire screen of the image, and the state continues for a certain time, it is determined that imaging is hindered by, for example, color spraying to a lens of the camera or covering of the lens with a cloth, and the mischief is detected.

In the passing detection, a specific subject such as a person and an object is recognized in a predetermined area of the image. When the specific subject is present, or not present, or makes a change in the certain area of each frame, the passage of a person or an object is detected.

Upon detecting occurrence of an event, the camera 130 transmits event start notification to the recording control apparatus 100. Further, upon detecting end of the event, the camera 130 transmits event end notification to the recording control apparatus 100. In place of the camera 30, the recording control apparatus 100 may include the image analysis function. In this case, the CPU 101 of the recording control apparatus 100 can detect start or end of the event based on the image received from the camera 130.

The upper-level system 140 can communicate with devices installed in the production facilities in order to, for example, manage the production facilities. The upper-level system 140 can acquire information different from the information acquired from the camera 130. More specifically, the upper-level system 140 acquires device information while the recording control apparatus 100 is recording an image. The device information includes an operation state (normal operation, maintenance operation, test operation, interruption, etc.) of each of the devices, presence/absence of error in each of the devices, measurement values of each of the devices, and a handling state (operation, on-site inspection) of an operator in each of the devices. Further, the upper-level system 140 controls the recording control apparatus 100 to record or delete the image acquired from the camera 130.

As the upper-level system 140, a single information processing apparatus may be used, or a system in which a plurality of information processing apparatuses connected through a network cooperate with one another to perform the processing may be used. For example, a supervisory control and data acquisition (SCADA) system and a manufacturing execution system (MES) can be used as the upper-level system 140. In a case where the upper-level system 140 is a single information processing apparatus, the upper-level system 140 may include a CPU, a main memory, a hard disk, a communication interface, an input interface, and a display controller, as with the recording control apparatus 100. The upper-level system 140 corresponds to an example of an external apparatus.

Next, specific processing carried out by the recording control apparatus 100 is described with reference to FIG. 2.

Figure 2:
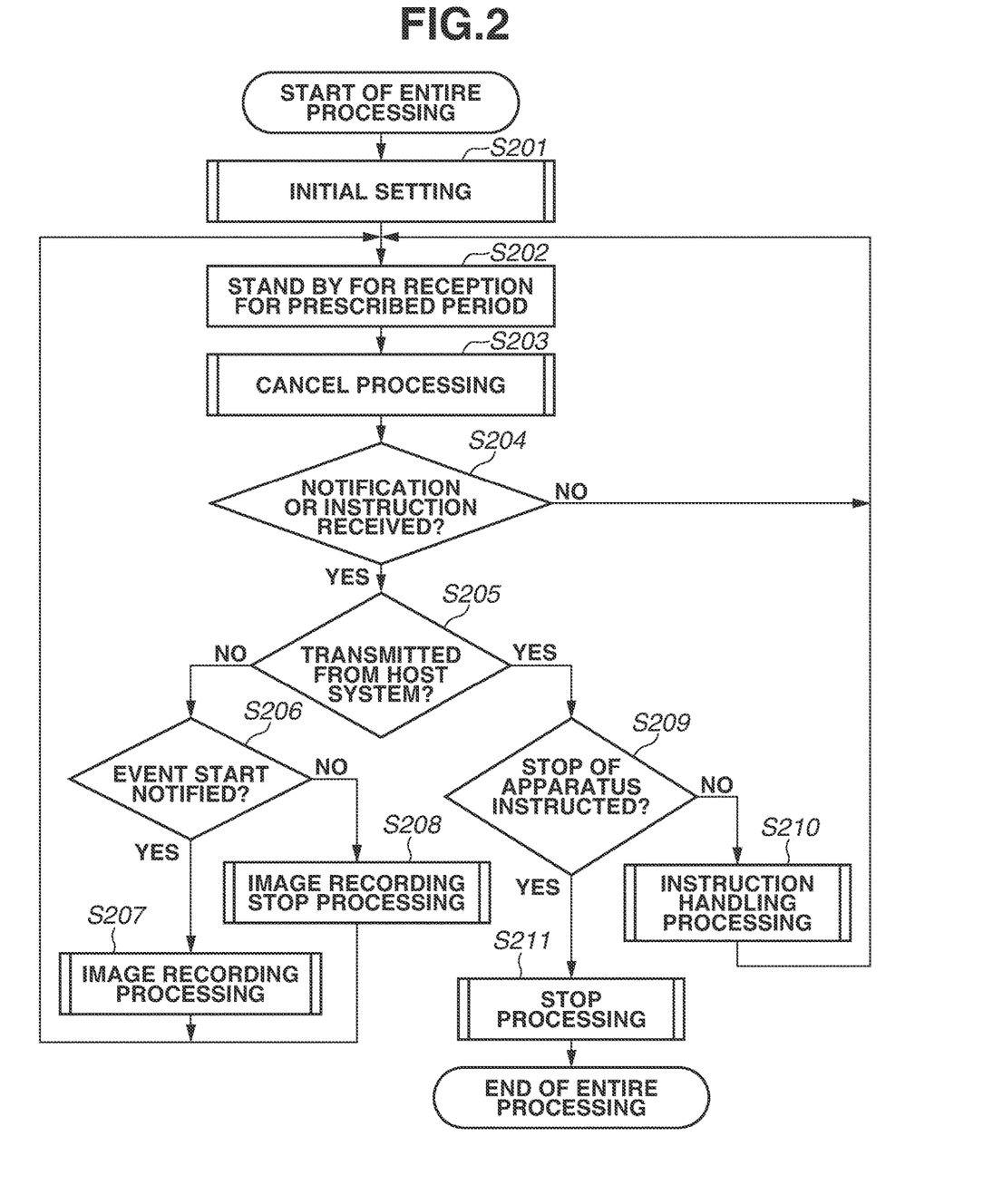
FIG. 2 is a flowchart illustrating an example of processing by a recording control apparatus.

FIG. 2 is a flowchart illustrating an example of the processing carried out by the recording control apparatus 100. The flowchart of FIG. 2 is realized when the CPU 101 develops programs recorded in the hard disk 103 onto the main memory 102 and executes the programs.

In step S201, the CPU 101 performs initial setting processing.

Figure 3A:
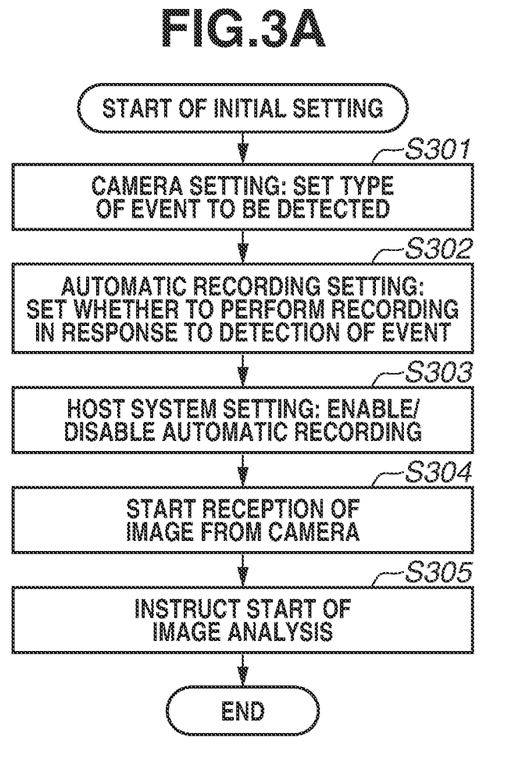
FIGS. 3A to 3C are flowcharts each illustrating an example of processing by the recording control apparatus.

FIG. 3A is a flowchart illustrating an example of the initial setting processing.

In step S301, the CPU 101 sets a detection content (event) to be detected by the camera 130 based on user input.

Figure 6A:
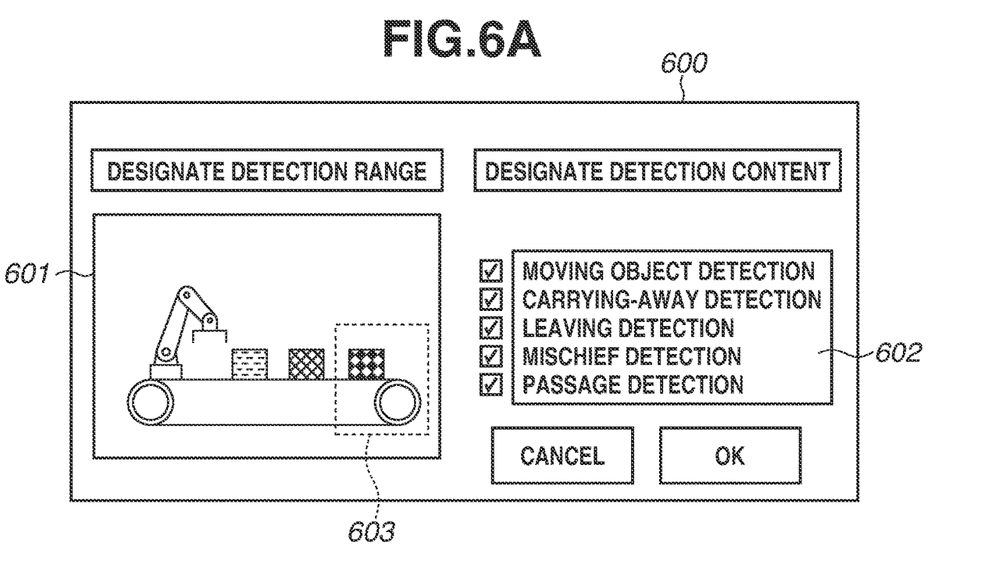
FIGS. 6A to 6C are diagrams each illustrating an example of a screen on the recording control apparatus and an upper-level system.

FIG. 6A is a diagram illustrating an example of a setting screen 600 for setting the detection content. The setting screen 600 displays an image area 601 where the image captured by the camera 130 is displayed, and a detection content list 602. The user designates a detection target range to be detected in the image area 601 by using a range designation frame 603. Further, the user designates, in the detection content list 602, an event content to be notified among events which occurs within the detection target range. The CPU 101 transmits the information about the detection content set in step S301, to the camera 130.

In step S302, the CPU 101 performs recording setting on the camera 130 based on the user input.

Figure 6B:
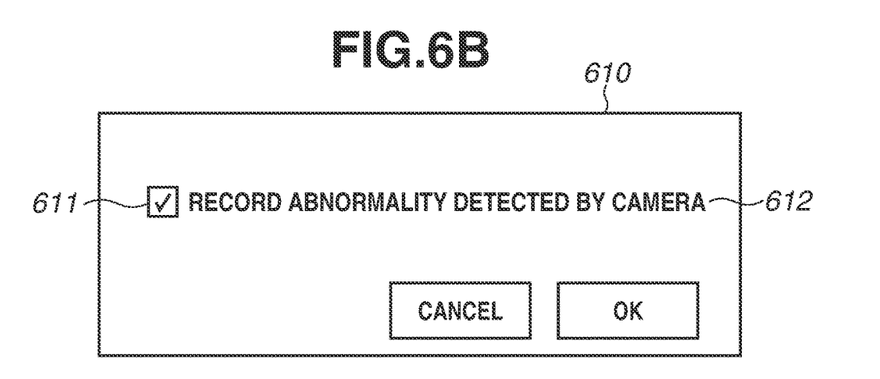

FIG. 6B is a diagram illustrating an example of a setting screen 610 for the recording setting. A check box 611 and a message 612 are displayed in the setting screen 610. To start recording of the image when occurrence of an event is detected as a trigger by the camera 130, the user checks the check box 611. The CPU 101 records information about the recording setting made to the camera 130, in the hard disk 103, etc.

In step S303, the CPU of the upper-level system 140 performs recording setting of the upper-level system 140 based on the user input.

Figure 6C:
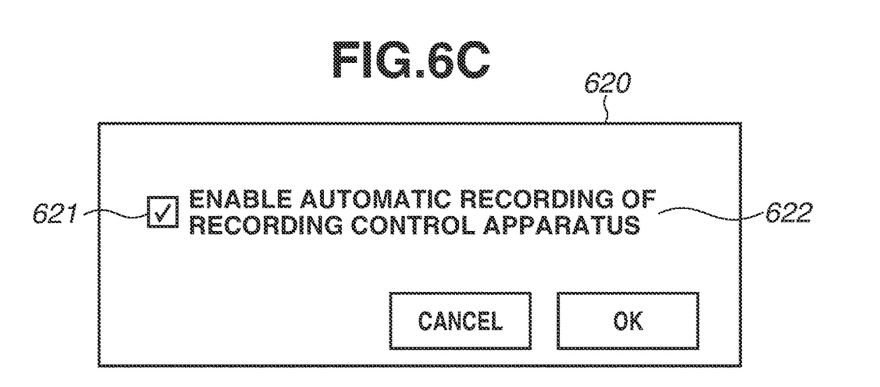

FIG. 6C is a diagram illustrating an example of a setting screen 620 for the recording setting, displayed on a display unit of the upper-level system 140. A check box 621 and a message 622 are displayed in the setting screen 620. To cause the recording control apparatus 100 to automatically start recording of the image, the user checks the check box 621. In a case where the check box 621 is checked, when the upper-level system 140 receives information indicating start of the image recording from the recording control apparatus 100, the upper-level system 140 transmits an automatic recording instruction to the recording control apparatus 100. In contrast, not to cause the recording control apparatus 100 to automatically start recording of the image, the user unchecks the check box 621. In a case where the check box 621 is unchecked, even when the upper-level system 140 receives information indicating start of the image recording from the recording control apparatus 100, the upper-level system 140 does not transmit the automatic recording instruction to the recording control apparatus 100. The automatic image recording can be stopped through processing in FIG. 3B described below.

Upon receiving information indicating end of the image recording from the recording control apparatus 100, the upper-level system 140 selectively transmits a cancel instruction based on the information.

In step S304, the CPU 101 starts reception of the image from the camera 130.

In step S305, the CPU 101 transmits an instruction to the camera 130 to start image analysis for event detection. When the camera 130 detects occurrence of the event as a result of the image analysis, the camera 130 transmits event start notification to the recording control apparatus 100. In a case where the recording control apparatus 100 has an image analysis function, the CPU 101 of the recording control apparatus 100 may start the image analysis of the image obtained from the camera 130, and may detect occurrence of an event as a result of the image analysis.

After the initial setting is completed through such processing, the processing proceeds to step S202.

In step S202, the CPU 101 stands by for reception of notification from the camera 130 or an instruction from the upper-level system 140, for a certain period. When the CPU 101 receives the notification or instruction or when the certain period elapses, the processing proceeds to step S203.

The processing in step S203 is described below with reference to a flowchart of FIG. 3C. Thereafter, the processing proceeds from step S203 to step S204.

In step S204, the CPU 101 determines whether the CPU 101 has received the notification or instruction. In a case where the CPU 101 has received the notification or instruction (YES in step S204), the processing proceeds to step S205. In a case where the CPU 101 has not received the notification or instruction (NO in step S204), the processing returns to step S202.

In step S205, the CPU 101 determines whether the notification or the instruction received in step S204 is issued from the upper-level system 140, namely, whether a transmission source is the upper-level system 140. In a case where the transmission source is the upper-level system 140 (YES in step S205), the processing proceeds to step S209. In contrast, in a case where the transmission source is not the upper-level system 140, namely, in a case where the CPU has received the notification from the camera 130 but the transmission source of the notification is the camera 130 (NO in step S205), the processing proceeds to step S206.

First, a case where the recording control apparatus 100 has received the event start notification from the camera 130 (NO in step S205) is described.

In step S206, the CPU 101 determines whether the notification from the camera 130 is the event start notification. In a case where the notification is the event start notification (YES in step S206), the processing proceeds to image recording processing in step S207. In contrast, in a case where the notification is not the event start notification, namely, in a case where the notification is event end notification (NO in step S206), the processing proceeds to image recording stop processing in step S208.

Figure 4A:
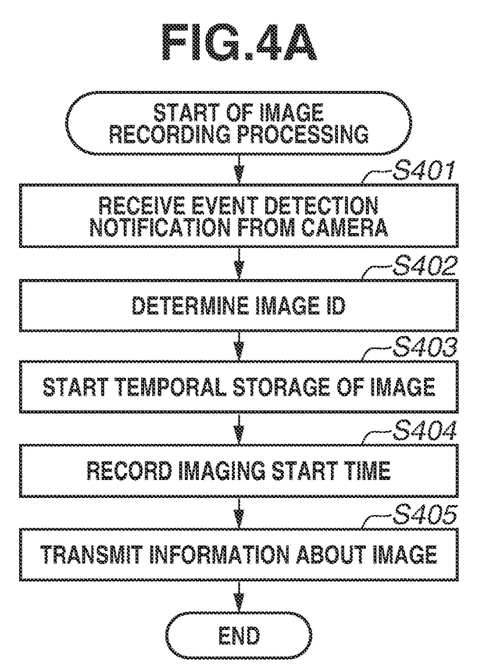
FIGS. 4A to 4C are flowcharts each illustrating an example of processing by the recording control apparatus.

FIG. 4A is a flowchart illustrating an example of the image recording processing in step S207.

In step S401, the CPU 101 obtains detailed information included in the event start notification received from the camera 130. The detailed information includes information about the camera 130 (e.g., camera identification information) that has detected occurrence of the event, information about a type of the detected event, etc. The camera 130 detects an event corresponding to the detection content set in step S301, and when the camera 130 detects occurrence of the event, the camera 130 transmits the event start notification.

In step S402, the CPU 101 determines an image identification (ID) of the image received from the camera 130.

Figure 5A:
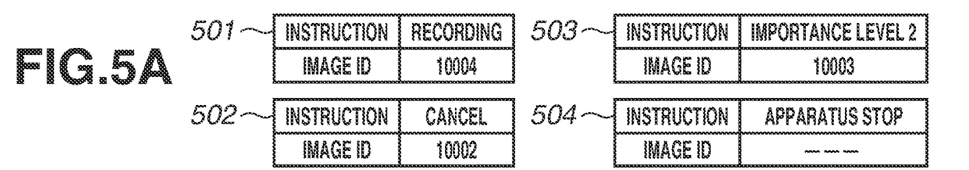
FIGS. 5A to 5F are diagrams illustrating an example of instruction information and information about an image recording state.
Figure 5B:
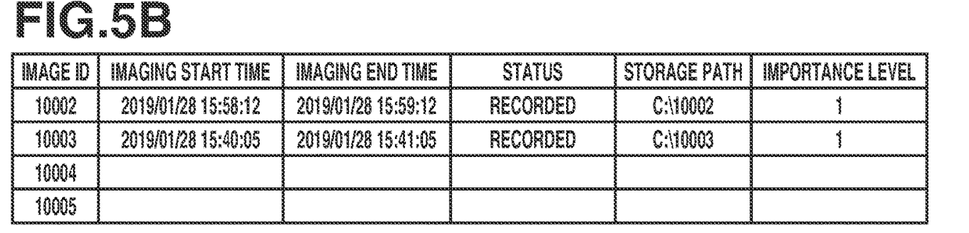

In information about the image recording state illustrated in FIG. 5B, an image ID "10004" is not used. Therefore, the CPU 101 determines that the image ID is "10004".

In step S403, the CPU 101 records the image being received from the camera 130. In the present exemplary embodiment, the CPU 101 starts processing to temporarily store the image being received from the camera 130, in the main memory 102. The recording control apparatus 100 receives the image from the camera 130, holds the image for a predetermined period in a buffer, and updates the image in the buffer when a new image is received, but does not store the image in the main memory 102 until the event start is notified. When the event start is notified, the recording control apparatus 100 copies the image held in the buffer to the main memory 102 and stores it.

In step S404, the CPU 101 records a time when imaging of the image temporarily stored in the main memory 102 is started. More specifically, the CPU 101 adds the time when the imaging is started, to an imaging start time in the information about the image recording state, and changes and records a status.

Figure 5C:
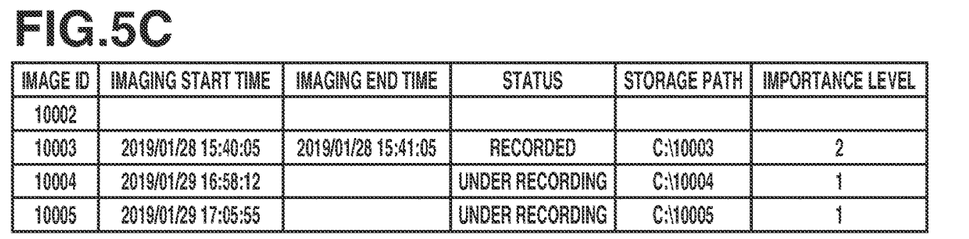

FIG. 5C is a diagram illustrating the information about the image recording state added at the time when the imaging is started. In the information about the image recording state illustrated in FIG. 5C, with respect to the image having the image ID "10004", the imaging start time is added, "under recording" is added to the status, and "1" is added to an importance level.

In step S405, the CPU 101 transmits, to the upper-level system 140, information indicating start of image recording and information about the image, recording of which has been started. The information about the image in the processing in step S405 includes the image ID. The information about the image at this time may not include the imaging start time. The upper-level system 140 uses an own clocking unit to clock the time when the information indicating the start of image recording is received from the recording control apparatus 100, thereby recording the imaging start time. The CPU 101 may transmit the imaging start time as the information indicating start of imaging, to the upper-level system 140.

The processing returns to step S202 after such processing is performed, and the CPU 101 stands by for reception of notification or an instruction.

In a case where the automatic recording is permitted in setting (check box 621 in FIG. 6C is checked) when the upper-level system 140 receives the information about the image, recording of which has been started, from the recording control apparatus 100, the upper-level system 140 transmits the automatic recording instruction to the recording control apparatus 100. In contrast, in a case where the automatic recording is not permitted in setting (check box 621 in FIG. 6C is unchecked), the upper-level system 140 does not transmit the automatic recording instruction to the recording control apparatus 100. In a case where the recording control apparatus 100 has not received the automatic recording instruction from the upper-level system 140 during a period from when the recording control apparatus 100 transmits the information about the image, recording of which has been started, to the upper-level system 140, until a predetermined time elapses, the processing is described below with reference to a flowchart of FIG. 3B.

In the case where the notification is not the event start notification, namely, in the case where the notification is the event end notification, the processing proceeds to the image recording stop processing in step S208. A case where image recording is stopped in response to reception of the event end notification from the camera 130 is described. The image recording state before the event end notification is received from the camera 130 is described with reference to FIG. 5C. FIG. 5C is a diagram illustrating the information about the image recording state before the event end notification is received. In the information about the image recording state illustrated in FIG. 5C, a status corresponding to the image IDs "10004" and "10005" is "under recording". Accordingly, a time is not recorded in the imaging end time corresponding to each of the image IDs "10004" and "10005".

Figure 4B:
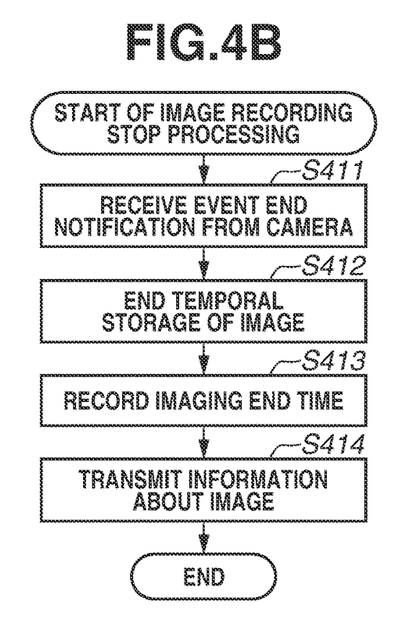

FIG. 4B is a flowchart illustrating an example of the image recording stop processing in step S208.

In step S411, the CPU 101 receives the detailed information included in the event end notification received from the camera 130. The detailed information includes information about the camera 130 (e.g., camera identification information) that has detected end of the event, information about a type of the end event, etc.

In step S412, the CPU 101 ends recording of the image being received from the camera 130. In the present exemplary embodiment, the CPU 101 ends the processing for temporarily storing the image being received from the camera 130, in the main memory 102.

In step S413, the CPU 101 records a time when imaging of the image temporarily stored in the main memory 102 is ended. More specifically, the CPU 101 adds the time when the imaging of the recorded image is ended, to the imaging end time in the information about the image recording state, and changes and records the status.

Figure 5D:
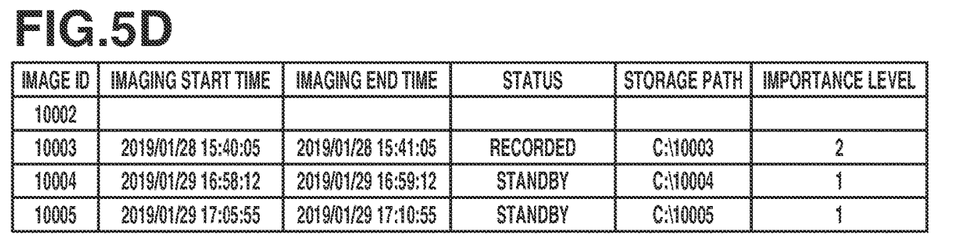

FIG. 5D is a diagram illustrating the information about the image recording state added at the time when the imaging is ended. In the information about the image recording state illustrated in FIG. 5D, with respect to the images having the image IDs "10004" and "10005", the imaging end time is added, and the status is changed from "under recording" to "standby".

In step S414, the CPU 101 transmits information about the image, recording of which has been ended, to the upper-level system 140. The information about the image in the processing in step S414 includes the image ID, the imaging start time, the camera information, and the information about the type of the event. The upper-level system 140 receives the image ID, the imaging start time, the camera information, and the information about the type of the event from the recording control apparatus 100.

In step S414, the CPU 101 may transmit the recorded image itself to the upper-level system 140. Further, in a case where a data amount of the recorded image is large, the CPU 101 may transmit the image in response to image transmission request from the upper-level system 140.

After the image recording stop process ends through such processing, the processing returns to step S202, and the CPU 101 stands by for next reception of notification or an instruction.

The upper-level system 140 determines whether to delete or record the image corresponding to the image ID, namely, whether to transmit a cancel instruction or a recording instruction, based on the information about the image. For example, the upper-level system 140 specifies a device to be captured by the camera, based on the camera information included in the information about the received image. Next, the upper-level system 140 refers to the device information about the specified device after the imaging start time. In a case where the operation state is normal operation, or error has not occurred, or the handling state shows no on-site inspection, the upper-level system 140 determines that it is detection of a true event. In this case, the upper-level system 140 transmits the recording instruction in association with the image ID.

In contrast, the upper-level system 140 refers to the device information about the specified device after the imaging start time, and in a case where the operation state is maintenance operation, error has occurred, or the handling state is the on-site inspection, the upper-level system 140 determines that it is event detection caused by entrance of the inspector. In this case, the upper-level system 140 transmits the cancel instruction in association with the image ID. However, in a case where the type of the event detection is not the moving object detection, the removed object detection, the abandoned object detection, or the passing detection but is the camera tampering detection, the upper-level system 140 determines it as detection of a true event irrespective of the device information. In other words, the upper-level system 140 transmits not the cancel instruction but the recording instruction in association with the image ID.

Next, a case where the recording control apparatus 100 has received the instruction from the upper-level system 140 (YES in step S205) is described.

An example of the instruction information indicating the instruction from the upper-level system 140 is described with reference to FIG. 5A. In each of instruction information 501 to 504 of FIG. 5A, the instruction content and the image ID of the image to be processed are associated with each other.

The instruction information 501 is a recording instruction to record the image to be processed.

The instruction information 502 is an instruction to delete the image to be processed, namely, a cancel instruction to cancel the recording.

The instruction information 503 is a change instruction to change the importance level of the image to be processed.

The instruction information 504 is a stop instruction to stop the apparatus. Unlike other instruction information 501 to 503, the instruction information 504 is not associated with the image ID.

In step S209, the CPU 101 determines whether the instruction from the upper-level system 140 is an instruction to stop the recording control apparatus 100. In a case where the instruction is the instruction to stop the apparatus (YES in step S209), the processing proceeds to stop processing in step S211. In contrast, in a case where the instruction is not the instruction to stop the apparatus (NO in step S209), the processing proceeds to instruction handling processing in step S210.

Figure 4C:
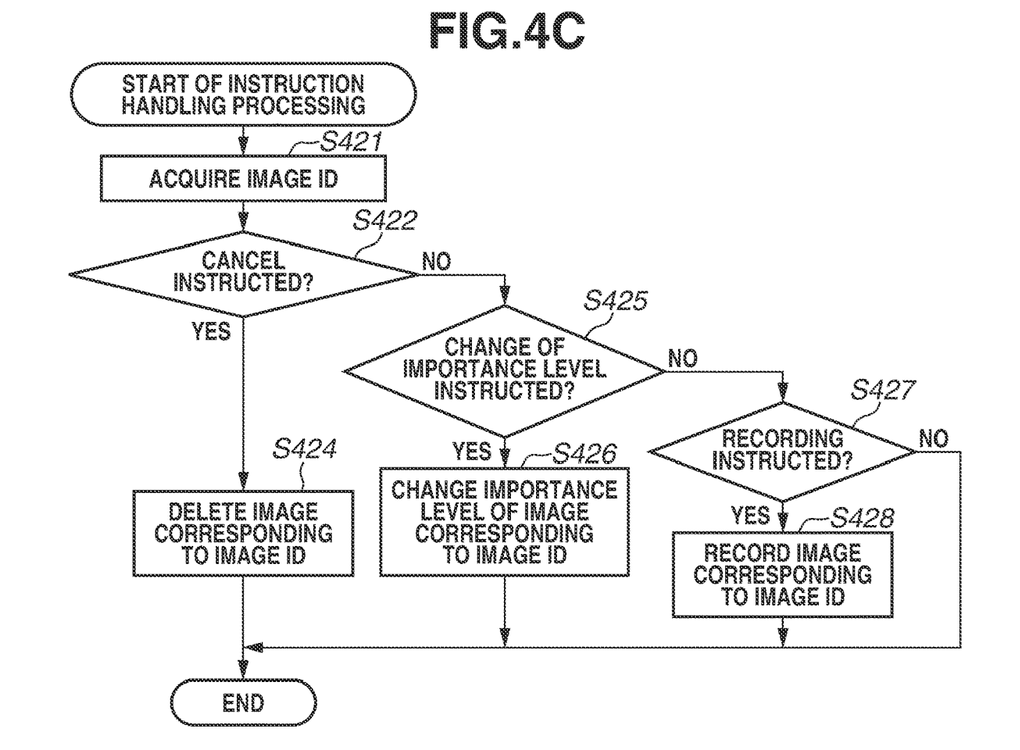

FIG. 4C is a flowchart illustrating an example of the instruction handling processing in step S210.

In step S421, the CPU 101 acquires the image ID transmitted in association with the instruction from the upper-level system 140, as the image ID of the image to be processed.

In step S422, the CPU 101 determines whether the instruction from the upper-level system 140 is the cancel instruction to cancel recording of the image temporarily stored in the main memory 102.

In a case where the instruction from the upper-level system 140 is the cancel instruction in step S422, namely, in a case where the instruction information 502 illustrated in FIG. 5A has been received (YES in step S422), the processing proceeds to step S424. In contrast, in a case where the instruction from the upper-level system 140 is not the cancel instruction (NO in step S422), the processing proceeds to step S425.

In step S424, the CPU 101 deletes the image corresponding to the image ID from the main memory 102. As a result, in the present exemplary embodiment, the CPU 101 does not record the image temporarily stored in the main memory 102, in the hard disk 103. In a case where the image corresponding to the image ID has been already recorded in the hard disk 103 or in a case where the image corresponding to the image ID is directly recorded in the hard disk 103 without being temporarily stored in the main memory 102, the CPU 101 deletes the image corresponding to the image ID from the hard disk 103. Further, in a case where the image corresponding to the image ID has been already recorded as an image file, the CPU 101 deletes the image file corresponding to the image ID. By deleting the image instructed by the upper-level system 140 in the above-described manner, the unnecessary image can be prevented from wastefully using the storage capacity of the hard disk 103. Even in a case where a plurality of images has been recorded in the main memory 102 or the hard disk 103, the CPU 101 deletes the image corresponding to the image ID associated with the cancel instruction. By deleting the image in the above-described manner, recording of the image determined as an unnecessary image by the upper-level system 140 can be prevented.

FIG. 5B is a diagram illustrating the information about the image recording state before reception of the cancel instruction.

In the information about the image recording state illustrated in FIG. 5B, the images corresponding to the image IDs "10002" and "10003" have been already recorded.

FIG. 5C is a diagram illustrating the information about the image recording state after the cancel instruction for the image ID "10002" has been received from the upper-level system 140. The CPU 101 deletes the image corresponding to the image ID "10002", and deletes the information associated with the image ID "10002".

On the other hand, in step S425, the CPU 101 determines whether the instruction from the upper-level system 140 is the change instruction to change the importance level.

In a case where the instruction from the upper-level system 140 is the change instruction, namely, in a case where the instruction information 503 illustrated in FIG. 5A has been received (YES in step S425), the processing proceeds to step S426. In contrast, in a case where the instruction from the upper-level system 140 is not the change instruction (NO in step S425), the processing proceeds to step S427.

In step S426, the CPU 101 changes the importance level of the image which corresponds to the image ID.

FIG. 5B is a diagram illustrating the information about the image recording state before reception of the change instruction.

In the information about the image recording state illustrated in FIG. 5B, the importance level associated with the image ID "10003" is "1".

FIG. 5C is a diagram illustrating the information about the image recording state after the change instruction to change the importance level of the image ID "10003" has been received from the upper-level system 140. The CPU 101 changes the importance level associated with the image ID "10003" from "1" to "2".

In step S427, the CPU 101 determines whether the instruction from the upper-level system 140 is the recording instruction to record the recorded image. In a case where the instruction from the upper-level system 140 is the recording instruction, namely, in a case where the instruction information 501 illustrated in FIG. 5A has been received (YES in step S427), the processing proceeds to step S428. In contrast, in a case where the instruction from the upper-level system 140 is not the recording instruction (NO in step S427), the instruction handling processing ends.

In step S428, the CPU 101 performs processing to record the image corresponding to the image ID. In the present exemplary embodiment, the CPU 101 copies to and records in the hard disk 103, the image stored in the main memory 102. The CPU 101 deletes the image recorded in the hard disk 103, from the main memory 102. As a result, a free capacity of the main memory 102 can be secured and an image newly received can be stored.

FIG. 5D is a diagram illustrating the information about the image recording state before reception of the recording instruction.

In the information about the image recording state illustrated in FIG. 5D, the status associated with the image ID "10004" is "standby".

Figure 5E:
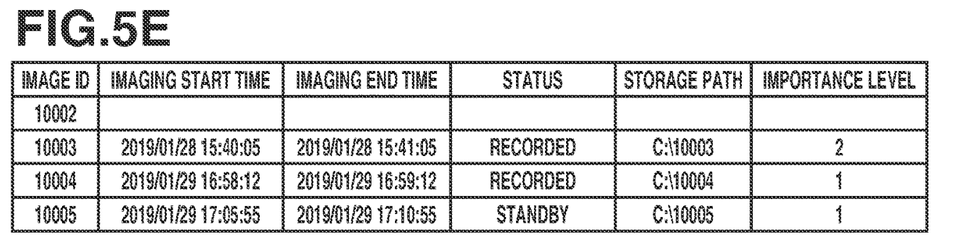

FIG. 5E is a diagram illustrating the information about the image recording state after reception of the recording instruction to record the image. The CPU 101 changes the status associated with the image ID "10004" from "standby" to "recorded".

After the instruction handling process ends through such processing, the processing returns to step S202, and the CPU 101 stands by for next reception of notification or an instruction.

Next, a case where the stop instruction to stop the recording control apparatus 100 has been received from the upper-level system 140 (YES in step S209) is described.

In a case where the stop instruction to stop the recording control apparatus 100 has been received from the upper-level system 140, namely, in a case where the instruction information 504 illustrated in FIG. 5D has been received in step S209, the processing proceeds to stop processing in step S211.

Figure 3B:
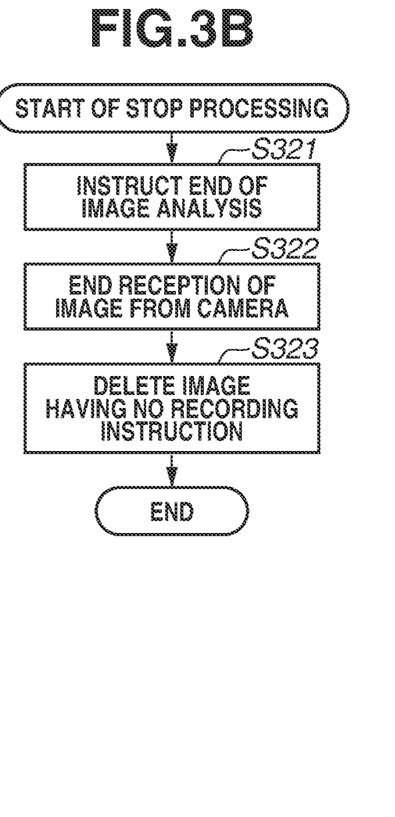

FIG. 3B is a flowchart illustrating an example of the stop processing to stop the recording control apparatus 100 in step S211.

In step S321, the CPU 101 transmits an instruction to the camera 130 to end the image analysis being performed by the camera 130 to stop the image analysis by the camera 130. In the case where the recording control apparatus 100 has the image analysis function, the CPU 101 of the recording control apparatus 100 ends the image analysis of the image received from the camera 130.

In step S322, the CPU 101 ends reception of the image from the camera 130.

In step S323, the CPU 101 deletes all of the images, recording of which is not instructed by the upper-level system 140. The CPU 101 can extract the image not instructed to be recorded by the upper-level system 140, based on the information about the image recording state. In the present exemplary embodiment, the CPU 101 deletes all of the images stored in the main memory 102, recording of which are not instructed, and does not record the images in the hard disk 103 by preventing the deleted images from being copied from the main memory 102 to the hard disk 103. In the case where the image corresponding to the image ID has been already recorded in the hard disk 103 or in the case where the image corresponding to the image ID is directly recorded in the hard disk 103 without being temporarily stored in the main memory 102, the CPU 101 deletes the image, recording of which is not instructed, from the hard disk 103. By deleting all of the images, recording of which is not instructed in the above-described manner, recording of the images determined as unnecessary images by the upper-level system 140 cannot be recorded. The entire processing ends after such processing is carried out.

Next, a case where the recording control apparatus does not receive the automatic recording instruction from the upper-level system 140 for a certain period after the recording control apparatus 100 transmits the event start notification to the upper-level system 140 in step S405, is described.

In a case where it is clear that the inspector enters an area in order to maintain the production facilities, etc., by changing the recording setting of the upper-level system 140, the recording control apparatus 100 can be caused not to perform the automatic image recording. More specifically, the user unchecks the check box 621 in the setting screen 620 for the recording setting for the upper-level system 140 in FIG. 6C.

In a case where the check box 621 is unchecked, the upper-level system 140 ignores the event start notification from the recording control apparatus 100, and does not transmit the automatic recording instruction to the recording control apparatus 100.

Accordingly, the recording control apparatus 100 does not receive the automatic recording instruction from the upper-level system 140 for the certain period in step S202, and the processing proceeds to the cancel processing in step S203. The certain period may begin after start of the image recording. The certain period may be previously recorded in the hard disk 103 of the recording control apparatus 100, or an optional period may be set by the user every time.

Figure 3C:
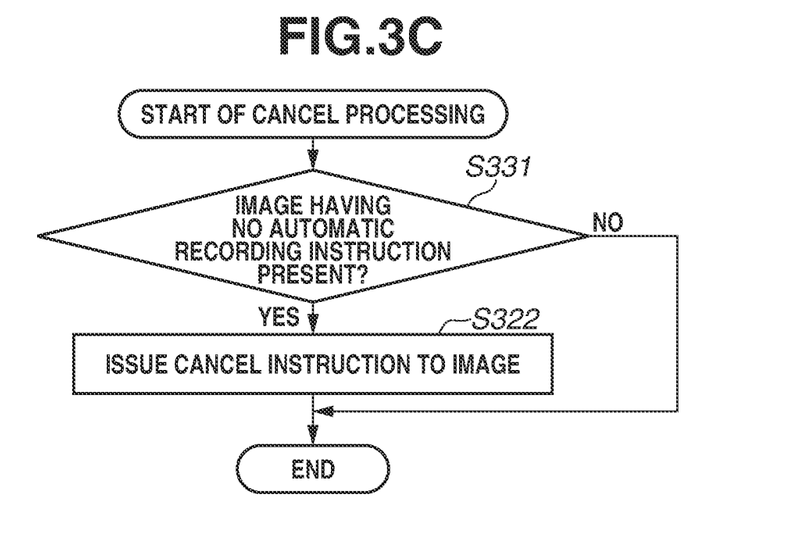

FIG. 3C is a flowchart illustrating an example of the cancel processing in step S203.

The information about the image recording state before reception of the event start notification from the camera 130 is described with reference to FIG. 5B. The information about the image recording state is recorded in, for example, the hard disk 103 of the recording control apparatus 100.

FIG. 5B is a diagram illustrating the information about the image recording state before reception of the event start notification. The information about the image recording state is information to manage the recording state of the image received from the camera 130.

The information about the image recording state includes the image ID, the imaging time (imaging start time and imaging end time), the status, a storage path, and the importance level. The image ID is an example of identification information for uniquely identifying the image. The status is information indicating a reception state of the automatic recording instruction received from the upper-level system 140 and a state of the instructed processing. The status includes "recorded" indicating end of recording of the image instructed to be automatically recorded, "under recording" indicating that the image instructed to be automatically recorded is under recording, and "standby" indicating that the image stands by for the automatic recording instruction from the upper-level system 140. The storage path is information indicating an address of a storage where the image is recorded. The importance level is information indicating the importance level of the image.

The information about the image recording state illustrated in FIG. 5B indicates that the images corresponding to the image IDs "10002" and "10003" have been already recorded.

In step S331, the CPU 101 refers to the information about the image recording state, and determines whether an image is present that is stored for a predetermined period from the imaging start time, and an instruction for automatically recording it has not been received from the upper-level system 140. In a case where the image not instructed to be automatically recorded is present (YES in step S331), the processing proceeds to step S332. In a case where the image not instructed to be automatically recorded is not present (NO in step S331), the processing ends.

In the case of the information on the image recording state illustrated in FIG. 5B, statuses of all of the images are "recorded", and the image standing by for the automatic recording instruction is not present. Therefore, the cancel processing ends without proceeding to step S332, and the processing proceeds to step S204.

In contrast, in the case of the information about the image recording state illustrated in FIG. 5E, the status associated with the image ID "10005" is "standby". Since the image that is standing by for the automatic recording instruction is present, the processing proceeds to step S332.

In step S332, the CPU 101 refers to the information about the image recording state, identifies the image ID of the image that is stored for a predetermined period from the imaging start time and is not instructed by the upper-level system 140 to be automatically recorded, and stops recording the image corresponding to the image ID in the main memory 102. Next, the CPU 101 issues a cancel instruction associated with the image ID identified by the upper-level system 140. More specifically, the CPU 101 issues the instruction information 502 illustrated in FIG. 5A by itself, determines that the instruction has been received in step S204, determines that the transmission source is the upper-level system 140 in step S205, and performs the subsequent processing. As a result, in the present exemplary embodiment, in step S424, the CPU 101 deletes the image stored in the main memory 102 and does not record the image in the hard disk 103. In the case where the image corresponding to the image ID has been already recorded in the hard disk 103 or in the case where the image corresponding to the image ID is directly recorded in the hard disk 103 without being temporarily stored in the main memory 102, the CPU 101 deletes the image corresponding to the image ID from the hard disk 103. Further, in the case where the image corresponding to the image ID has been already recorded as an image file, the CPU 101 deletes the image file corresponding to the image ID.

Figure 5F:
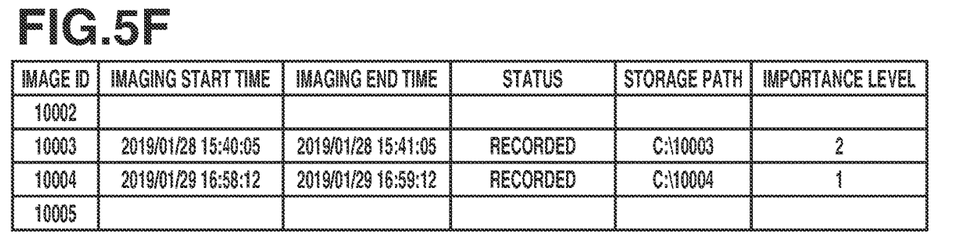

FIG. 5F is a diagram illustrating the information about the image recording state when the image that is standing by for the automatic recording instruction is present and the CPU 101 issues the cancel instruction after the predetermined period elapses from the imaging start time of the image. The CPU 101 deletes the image corresponding to the image ID "10005", and deletes the information associated with the image ID "10005".

As described above, the recording control apparatus 100 according to the present exemplary embodiment starts recording of the image captured by the camera 130, and in the case where the cancel instruction is received from the upper-level system 140 or the automatic recording instruction is not received for a certain period, performs control to delete the image. Therefore, the image not requiring the recording can be deleted. This facilitates search of a desired image among the recorded images. Further, since the unnecessary image can be deleted, it is possible to prevent the recording capacity of the recording medium such as the hard disk 103 from being occupied by the unnecessary image.

Further, the recording control apparatus 100 according to the present exemplary embodiment transmits the information about the image, recording of which has been started, to the upper-level system 140. The information about the image includes at least one of the information about the camera 130, the image ID, the information about the type of the event, and the information about the imaging time. The recording control apparatus 100 can receive an instruction corresponding to the camera 130 from the upper-level system 140 by transmitting the information about the camera 130. Further, even when the plurality of images is recorded, the recording control apparatus 100 can receive an instruction directed to the predetermined image by transmitting the image ID. Further, the recording control apparatus 100 can receive an instruction corresponding to the type of the event which has occurred, from the upper-level system 140 by transmitting the information about the type of the detected event. Further, the recording control apparatus 100 can receive an instruction corresponding to the imaging time from the upper-level system 140 by transmitting the information about the imaging time.

First Modification

In the above-described exemplary embodiment, the case where the CPU 101 transmits the information indicating start of the image recording and the information about the image, recording of which has been started, to the upper-level system 140 in step S405, has been described; however, the information is not limited thereto. For example, the information transmitted in step S405 may be similar to the information transmitted in step S414. In other words, in step S405, the CPU 101 may transmit, as the information about the image, recording of which has started, the image ID, the imaging start time, the camera information, and the information about the type of the event to the upper-level system 140.

When the information about the image, recording of which has been started, is transmitted, the upper-level system 140 determines necessity of the image recording even during the image recording without waiting for end of the event, namely, without waiting for end of temporary storage of the image in step S412, and transmits the cancel instruction to the recording control apparatus 100. Accordingly, in a case where the image is under recording in step S424, the CPU 101 can prevent the unnecessary image from being stored in the main memory 102 by stopping storage of the image received from the camera 130 in the main memory 102. Further, the CPU 101 deletes the already stored image from the main memory 102. Thus, the recording control apparatus 100 can prevent the unnecessary image from being continuously recorded.

Second Modification

In the above-described embodiment, the case where the image instructed to be canceled is immediately deleted, has been described; however, the deletion is not limited thereto. In step S332, step S424, or the like, the CPU 101 of the recording control apparatus 100 may record information indicating deletion in the information about the image recording state, in association with the image ID to be deleted. In this case, in step S323, the CPU 101 of the recording control apparatus 100 can collectively delete the images of the image IDs associated with the information indicating deletion.

Third Modification

In the above-described embodiment, the case where camera 130 or the recording control apparatus 100 detects occurrence or end of the event based on the image captured by the camera 130, has been described; however, the detection is not limited thereto. For example, the camera 130 or the recording control apparatus 100 may detect occurrence or end of the event based on sound acquired by a microphone provided in the camera 130. In this case, the camera 130 or the recording control apparatus 100 has a sound analysis function to detect abnormal sound, etc.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-123740, filed Jul. 2, 2019, which is hereby incorporated by reference herein in its entirety.

What is claimed is:

1. A recording control apparatus that controls to record an image captured by an imaging apparatus, the recording control apparatus comprising:
   a control unit configured to control start of recording of the image captured by the imaging apparatus based on information acquired from the imaging apparatus; and
   a reception unit configured to receive an instruction with respect to the image, recording of which has been started by the control unit, from an external apparatus configured to acquire information different from the information acquired from the imaging apparatus,
   wherein, in a case where an instruction to delete the image is received from the external apparatus or in a case where an instruction to the image is not received from the external apparatus for a certain period, the control unit performs control to delete the image, recording of which has been started, and
   wherein, when the image captured by the imaging apparatus is under recording, in the case where the instruction to delete the image is received from the external apparatus or in the case where an instruction to the image is not received from the external apparatus for the certain period, the control unit performs control to stop recording of the image and to delete the image recorded before stop of the recording.

2. The recording control apparatus according to claim 1, further comprising a transmission unit configured to transmit information about the image, recording of which has been started by the control unit, to the external apparatus,
   wherein the information about the image includes at least one of information about the imaging apparatus capturing the image, identification information about the image, the information acquired from the imaging apparatus, and information about an imaging time of the image.

3. The recording control apparatus according to claim 1, wherein the control unit temporarily stores the image captured by the imaging apparatus in a predetermined storage area based on the information acquired from the imaging apparatus, and
   wherein, in the case where the instruction to delete the image is received from the external apparatus or in the case where the instruction to the image is not received from the external apparatus for the certain period, the control unit performs control to delete the image from the predetermined storage area.

4. The recording control apparatus according to claim 3, wherein, in a case where an instruction to record the image is received from the external apparatus, the control unit performs control to record the image from the predetermined storage area to a recording medium.

5. The recording control apparatus according to claim 1, wherein, in the case where the instruction to delete the image is received from the external apparatus or in the case where an instruction to the image is not received from the external apparatus for the certain period, the control unit performs control to record the image, recording of which has been started, in association with information indicating deletion.

6. The recording control apparatus according to claim 1, wherein, in a case where an instruction to stop recording of the image is received from the external apparatus, the control unit performs control to stop recording of the image.

7. The recording control apparatus according to claim 1, wherein, in a case where an instruction to change information indicating an importance level of the image is received from the external apparatus, the control unit performs control to change the information indicating the importance level of the image.

8. The recording control apparatus according to claim 1, wherein the information acquired from the imaging apparatus is information about at least one of moving object detection, removed object detection, abandoned object detection, camera tampering detection, and passing detection obtained through analysis of the image.

9. The recording control apparatus according to claim 1,
   wherein the information acquired from the imaging apparatus is an image, and
   wherein the control unit analyzes the image to perform at least one of moving object detection, removed object detection, abandoned object detection, camera tampering detection, and passing detection.

10. The recording control apparatus according to claim 1, wherein the reception unit receives an instruction determined by the external apparatus based on information indicating a state of a device communicable with the external apparatus, and the information acquired from the imaging apparatus.

11. The recording control apparatus according to claim 1,
    wherein the control unit performs control to stop recording of the image captured by the imaging apparatus based on the information acquired from the imaging apparatus, and
    wherein, in the case where the instruction to delete the image is received from the external apparatus or in the case where an instruction to the image is not received from the external apparatus for the certain period, the control unit performs control to stop recording of the image and to delete the image recorded before stop of the recording, irrespective of the information acquired from the imaging apparatus.

12. A control method of recording an image captured by an imaging apparatus, the method comprising:
    controlling start of recording of the image captured by the imaging apparatus based on information acquired from the imaging apparatus;
    receiving an instruction to the image, recording of which has been started, from an external apparatus configured to acquire information different from the information acquired from the imaging apparatus; and
    deleting the image, recording of which has been started, in a case where an instruction to delete the image is received from the external apparatus or in a case where an instruction to the image is not received from the external apparatus for a certain period,
    wherein, when the image captured by the imaging apparatus is under recording, in the case where the instruction to delete the image is received from the external apparatus or in the case where an instruction to the image is not received from the external apparatus for the certain period, controlling to stop recording of the image and to delete the image recorded before stop of the recording are performed.

13. A non-transitory computer-readable recording medium storing a program to cause a computer to execute a control method of recording an image captured by an imaging apparatus, the method comprising:
- controlling start of recording of the image captured by the imaging apparatus based on information acquired from the imaging apparatus;
- receiving an instruction to the image, recording of which has been started, from an external apparatus configured to acquire information different from the information acquired from the imaging apparatus; and
- deleting the image, recording of which has been started, in a case where an instruction to delete the image is received from the external apparatus or in a case where an instruction to the image is not received from the external apparatus for a certain period,
- wherein, when the image captured by the imaging apparatus is under recording, in the case where the instruction to delete the image is received from the external apparatus or in the case where an instruction to the image is not received from the external apparatus for the certain period, controlling to stop recording of the image and to delete the image recorded before stop of the recording are performed.

* * * * *